United States Patent
Abraham et al.

(10) Patent No.: US 11,143,570 B2
(45) Date of Patent: Oct. 12, 2021

(54) SYSTEM AND METHOD FOR LEAK TESTING GREEN TIRE ASSEMBLY ENCLOSURES

(71) Applicant: Bridgestone Bandag, LLC, Muscatine, IA (US)

(72) Inventors: Matthew J. Abraham, Illinois City, IL (US); Seth D. Taylor, Davenport, IA (US)

(73) Assignee: Bridgestone Bandag, LLC, Muscatine, IA (US)

( * ) Notice: Subject to any disclaimer, the term of this patent is extended or adjusted under 35 U.S.C. 154(b) by 177 days.

(21) Appl. No.: 16/493,064

(22) PCT Filed: Mar. 14, 2018

(86) PCT No.: PCT/US2018/022405
§ 371 (c)(1),
(2) Date: Sep. 11, 2019

(87) PCT Pub. No.: WO2018/175174
PCT Pub. Date: Sep. 27, 2018

(65) Prior Publication Data
US 2020/0132566 A1    Apr. 30, 2020

Related U.S. Application Data

(60) Provisional application No. 62/474,748, filed on Mar. 22, 2017.

(51) Int. Cl.
*G01M 3/32* (2006.01)
*B29D 30/00* (2006.01)
(Continued)

(52) U.S. Cl.
CPC ....... *G01M 3/3218* (2013.01); *B29D 30/0061* (2013.01); *G01M 3/027* (2013.01); *G01M 17/02* (2013.01); *B29D 2030/0066* (2013.01)

(58) Field of Classification Search
None
See application file for complete search history.

(56) References Cited

U.S. PATENT DOCUMENTS 3,867,792 A    2/1975  Pelletier
3,920,498 A   11/1975  Everhardt et al.
(Continued)

FOREIGN PATENT DOCUMENTS

CN    1737522      2/2006
CN    102759434   10/2012
(Continued)

OTHER PUBLICATIONS

Office Action for CN Patent Application No. 201880019720.9, dated Sep. 18, 2020.
(Continued)

*Primary Examiner* — Andre J Allen
*Assistant Examiner* — Jermaine L Jenkins (57) ABSTRACT

A system for leak testing an envelope for a tire assembly can include a rim, an envelope sized to accommodate a green tire assembly and secured to the rim, a vacuum system in fluid communication with the envelope, and a controller. The controller can be configured to pressurize the envelope to a predetermined pressure, compare a slope of pressure over time to a predetermined value, and enable proceeding with a depressurization of the envelope responsive to determining the slope of the pressure over time being more than or equal to the predetermined value.

20 Claims, 2 Drawing Sheets

(51) Int. Cl.
*G01M 3/02* (2006.01)
*G01M 17/02* (2006.01)

(56) References Cited

U.S. PATENT DOCUMENTS

| | | | |
|---|---|---|---|
| 4,090,901 A | 5/1978 | Baatz | |
| 4,115,171 A | 9/1978 | Dundon | |
| 4,269,643 A | 5/1981 | Brewer et al. | |
| 4,434,018 A * | 2/1984 | Brewer | B29D 30/542 156/96 |
| 4,490,325 A | 12/1984 | Mattson et al. | |
| 5,098,268 A * | 3/1992 | Robinson | B29C 43/104 156/96 |
| 5,417,900 A | 5/1995 | Martin, Sr. | |
| 6,783,343 B2 * | 8/2004 | Presti | B29D 30/542 156/394.1 |
| 7,114,935 B2 | 10/2006 | Thomas et al. | |
| 8,632,647 B2 * | 1/2014 | Chateau | B29D 30/542 156/96 |
| 2011/0146885 A1 | 6/2011 | D'Sidocky | |
| 2012/0161365 A1 | 6/2012 | Ichinose et al. | |
| 2013/0087940 A1 | 4/2013 | Young et al. | |
| 2013/0319085 A1 | 12/2013 | Schwab et al. | |
| 2014/0008005 A1 * | 1/2014 | Hara | B29D 30/56 156/128.1 |
| 2016/0318273 A1 * | 11/2016 | Merino Lopez | B29D 30/56 |

FOREIGN PATENT DOCUMENTS

| | | |
|---|---|---|
| CN | 102933381 | 2/2013 |
| CN | 110382979 | 10/2019 |
| EP | 0158439 A2 | 10/1985 |
| WO | 2015097375 A1 | 7/2015 |

OTHER PUBLICATIONS

Machine translation of WO2015097375A1 published on Jul. 2, 2015 owned by Jose Merino Lopez.

Hwang, Chan Yoon, International Search Report, dated Mar. 22, 2017, pp. 1-3, Korean Intellectual Property Office, Daejeon, Republic of Korea.

Hwang, Chan Yoon, Written Opinon on Patentability, dated Jun. 26, 2018, pp. 1-10, International Search Authority, Korean Intellectual Property Office, Daejeon, Republic of Korea.

* cited by examiner

SYSTEM AND METHOD FOR LEAK TESTING GREEN TIRE ASSEMBLY ENCLOSURES

FIELD OF THE DISCLOSURE

The present disclosure relates to a system and method for applying a tread to a tire casing, and, more particularly, to leak testing an enclosure or envelope positioned about the tire tread and casing.

BACKGROUND

Methods of applying a new tread to a new tire casing or retreading an old tire casing are used to extend the life of tires, particularly trucks and off-road vehicles. By applying a new tread to a used tire casing, the life of the tire casing is extended. Retreaded tires offer an economical and environmentally friendly alternative to new tires.

Applying a new cured tread to a tire casing includes first prepping the tire casing, which may involve the steps of removing any unwanted material on the tire casing surface for the tread by inspecting, repairing and buffing the tire casing to remove any oxidized rubber or remaining tread to thereby create a desired circumference on the tire casing. Once the tire casing has been prepared, the tire is built; i.e., a new tire tread is secured to the outer circumferential surface of the casing. There are two basic methods of securing a new tread to a tire casing: the hot cure method (also referred to as mold cure) and the cold cure method (also referred to as pre cure).

In the hot cure process, a green or uncured tread rubber is positioned around the outer circumferential surface of the tire casing of the prepared tire and the tire and green tread are then cured in a curing mold to permanently adhere the new tire tread to the tire casing. In the cold cure process, an uncured cushion rubber is applied over the prepared outer circumferential surface of the tire to act as a binding agent between the tire and the new tire tread, which has already been cured. The tire, including the new cured tread and cushion rubber, is then cured in a heating chamber or autoclave to permanently adhere the new tread to the tire casing.

An envelope may be positioned around the tire during the curing process of the cold cure method. The envelope is a flexible rubber case that fits over the tire casing and tire tread and may be secured at axially spaced radially inward ends to a rim. The envelope provides a seal around the tire casing and tire tread and may be connected to a vacuum that depressurizes the interior of the envelope during at least a portion of the curing process, which applies compressive forces to the tire tread against the tire casing.

SUMMARY

The present disclosure generally describes an air evacuation system to provide a vacuum to and test a curing assembly. The air evacuation system can include pneumatic control logic with multiple timing cycles to set up a boundary on time length for testing any particular enclosure in addition to a preset length of time to directly test for leaks when a predetermined vacuum level is reached.

Some implementations include a system for leak testing an envelope for a tire assembly. The system may include a rim, an envelope sized to accommodate a green tire assembly and secured to the rim, a vacuum system in fluid communication with the envelope, and a controller. The controller may be configured to depressurize the envelope to a predetermined vacuum, compare a slope of vacuum over time to a predetermined value, and enable proceeding with a depressurization of the envelope responsive to determining the slope of the vacuum over time being less than or equal to the predetermined value.

In some implementations, the vacuum system may include a Venturi vacuum system. In some implementations, the controller may be further configured to activate an indicator responsive to determining the slope of the vacuum over time being more than the predetermined value. In some implementations, the indicator may be a warning lamp or an audible indicator. In some implementations, enabling proceeding with the depressurization of the envelope may include setting a parameter value. In some implementations, enabling proceeding with the depressurization of the envelope may include activating a switch to enable a button or other physical component to be actuated. In some implementations, the predetermined vacuum may be at or above −14.7 psi. In some implementations, comparing the slope of the vacuum over time to the predetermined value may include accessing data indicative of one or more pressure sensor measurements. In some implementations, the predetermined value may be between −0 psi per second and −1 psi per second. In some implementations, the vacuum system may be in fluid communication with several envelopes.

Some implementations include process for leak testing an envelope for a tire assembly. The process may include depressurizing an envelope containing a green tire assembly mounted to a rim to a predetermined vacuum using a vacuum system, comparing a slope of vacuum over time to a predetermined value, and enabling proceeding with a depressurization of the envelope responsive to determining the slope of the vacuum over time being less than or equal to the predetermined value or activating an indicator responsive to determining the slope of the vacuum over time being more than the predetermined value.

In some implementations, the vacuum system may include a Venturi vacuum system. In some implementations, the indicator may be a warning lamp or an audible indicator. In some implementations, the predetermined vacuum may be at or above −14.7 psi. In some implementations, the vacuum system may be in fluid communication with several envelopes. In some implementations, enabling proceeding with the depressurization of the envelope may include activating a switch to enable a button or other physical component to be actuated.

Some implementations include an apparatus for leak testing an envelope for a tire assembly. The apparatus may include a vacuum system in fluid communication with an envelope and a controller. The envelope may be sized to accommodate a green tire assembly. The controller may be configured to depressurize the envelope to a predetermined vacuum, compare a slope of vacuum over time to a predetermined value, and enable proceeding with a depressurization of the envelope responsive to determining the slope of the vacuum over time being less than or equal to the predetermined value.

In some implementations, the vacuum system may include a Venturi vacuum system. In some implementations, the predetermined vacuum may be at or above −14.7 psi.

BRIEF DESCRIPTION OF THE DRAWINGS

The details of one or more implementations are set forth in the accompanying drawings and the description below.

Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

In the description that follows, structures and features that are the same or similar as shown in the various views of the drawings are denoted by the same reference numerals throughout the several views for consistency and simplicity, but it should be appreciated that the various structures or features may differ that those shown.

Figure 1:
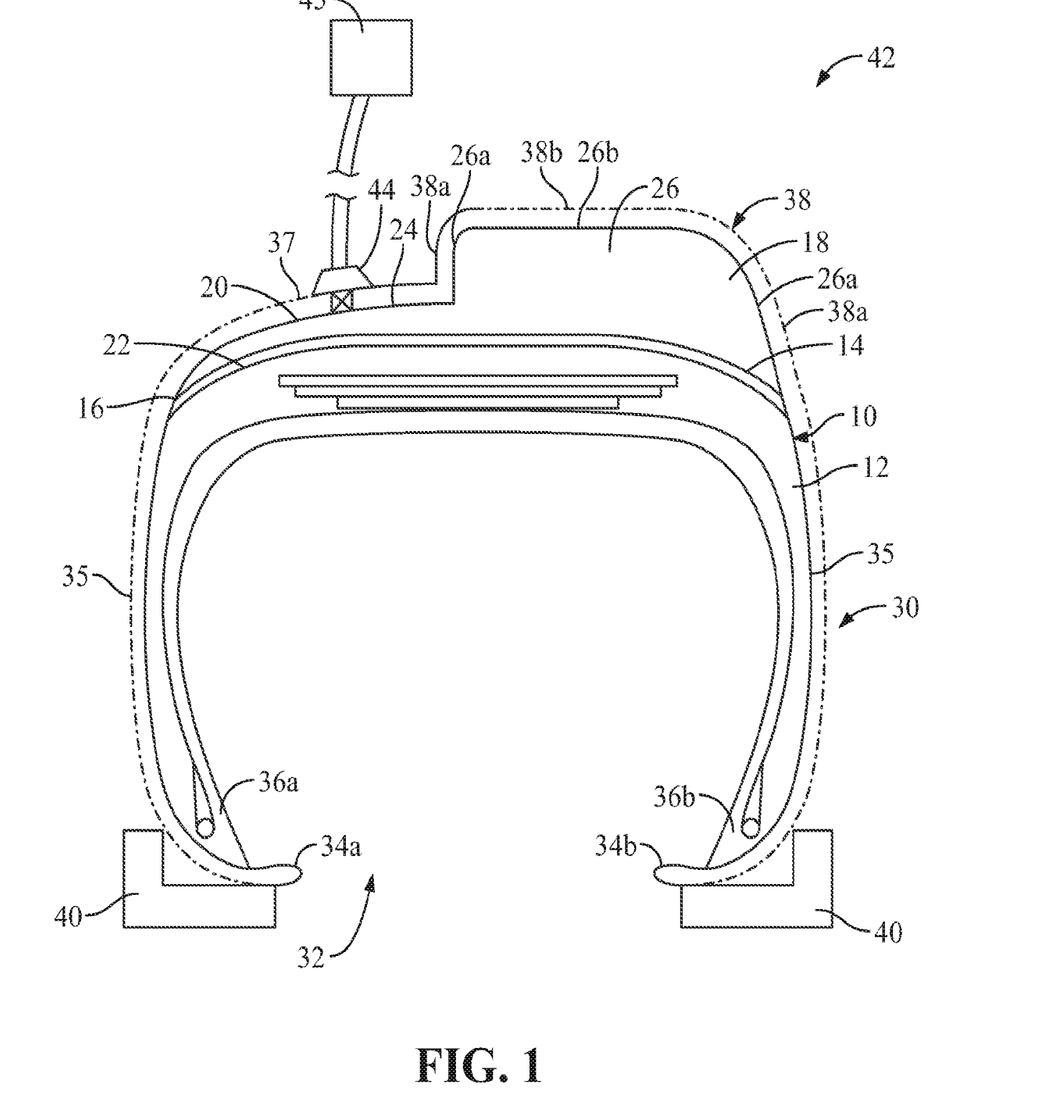
FIG. 1 is a section view of a tire in a curing envelope.
Figure 2:
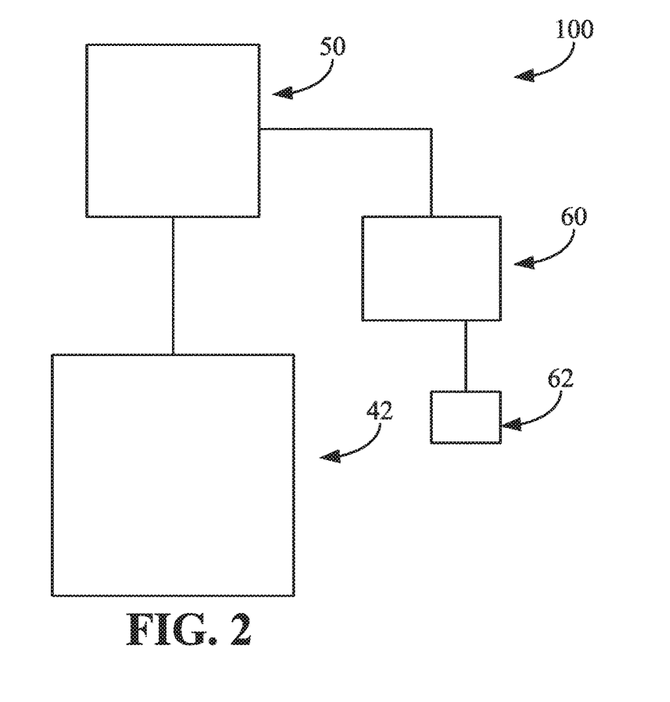
FIG. 2 is a block diagram of a system for leak testing the curing envelope of FIG. 1.

Referring to FIGS. 1-2, a method of forming a new tire and/or a retreaded tire 10 may include any known conventional steps to prepare a tire casing 12 to receive a new tread. In one or more embodiments, the tire casing 12 may first be inspected to ensure that it is a good candidate for initial treading or retreading. In certain implementations, the tire casing 12 may be manually inspected by a technician. In the same or other implementations, the tire casing 12 may be inspected by non-destructive inspection equipment. For example, in certain implementations, tire inspection may be performed using X-Ray equipment that detects is foreign objects are lodged in the tire casing and other defects that may impact the suitability of the tire casing for initial treading or retreading.

In one or more embodiments, following the step of inspection, and assuming the tire casing 12 is deemed suitable for further processing and treading or retreading, the tire casing 12 may be buffed. Buffing involves the mechanical and/or chemical removal of any oxidation and/or remaining tread on the tire casing 12 and creates a desired outer profile 14, which is the outer circumferential surface of the tire casing 12, for receiving a new tread. Buffing may be performed by grinding equipment that removes remaining tread rubber from the tire casing 12. In certain embodiments, the buffing equipment may be controlled by an electronic control system that may be programmed to create a desired circumference and casing profile 14. U.S. Pat. No. 8,585,843 discloses suitable buffing equipment for use in the treading or retreading method and is incorporated herein by reference in its entirety.

In one or more implementations, the method of treading or retreading may include the step of repairing defects in the tire casing 12. The repair work may be performed either prior to or after the step of buffing. In certain embodiments, the step of repairing defects may include filling holes such as, for example, nail holes, with an uncured rubber. The step of repairing the tire casing 12 may also include cleaning and filling other defects in the tire casing with uncured rubber. As will be appreciated by those skilled in the art, the uncured rubber used to repair defects in the tire casing 12 is cured during the curing process to permanently fill in the defects, and thereby prolong the useful life of the tire casing 12.

In one or more implementations, the outer profile 14 of the tire casing 12 may receive a coating of cement once the buffing and repairs have been completed. In certain embodiments, the cement may be applied by spraying or by rolling. The cement provides a tacky surface for application of a cushion rubber, and any known rubber cements may be utilized in the method of the present invention. In one or more implementations, the cement may include rubber and vulcanizing agents dispersed in a solvent. In certain embodiments, the rubber cement may be allowed to dry following application so that the solvent can evaporate, leaving a thin film of tacky rubber on the outer circumferential surface of the tire carcass.

U.S. Pat. No. 4,808,657, which is incorporated herein by reference in its entirety, discloses a suitable rubber cement for use in the retreading process of the present invention, and is incorporated herein by reference for that purpose. Rubber cements are available in a variety of forms and from a variety of commercial vendors, such as, for example: Fiber Bond Cement manufactured and sold by Patch Rubber Company, and ZEVOC® manufactured by APV Engineered Coatings (water-based cement). It is also contemplated that the process of the present disclosure may be performed without applying a cement.

Once the tire casing 12 has been prepped, a new tire tread 18 may be applied, which may be referred to as building the tire, to form a green tire assembly. In one or more embodiments, a layer of cushion rubber 16 is positioned between the outer circumferential surface 14 of the tire casing 12 and the tire tread 18. In certain implementations, the cushion rubber 16 may be applied to an interior surface of the new tire tread 18 prior to positioning the tread on the tire casing 12. In other implementations, the cushion rubber 16 may be applied directly to the outer circumferential surface 14 of the tire casing 12 prior to positioning of the new tire tread 18 on the casing. In one or more implementations, the cushion rubber 16 may be a strip of uncured rubber for bonding the cured tire casing 12 and the cured tread rubber 18 together. An example bonding system and method suitable for securing the new tire tread 18 to the tire casing 12 is disclosed in U.S. Pat. No. 5,462,617, which is incorporated herein by reference in its entirety.

In one or more implementations, the cushion rubber 16 may be formed from a rubber vulcanizate having a high percentage or amount of natural rubber or synthetic rubber, or blends thereof. Suitable types of synthetic rubbers include those made from conjugated dienes having generally from about 4 to about 12 carbon atoms and, preferably from about 4 to about 8 carbon atoms such as butadiene, isoprene, from conjugated dienes having from 4 to 12 carbon atoms with monomers of vinyl substituted aromatics having from 8 to 12 carbon atoms such as styrene, alpha-methylstyrene, and the like. Examples of suitable synthetic rubbers include polybutadiene, polyisoprene, and styrene-butadiene rubber. In certain implementations, the rubber may be compounded with conventional amounts of various additives such as, for example, oil, fillers, processing aids, zinc oxide, stearic acid, sulfur, various accelerators, antioxidants and antiozonants. U.S. Pat. No. 5,503,940 discloses a suitable cushion rubber and is which is incorporated herein by reference in its entirety for that purpose.

In one or more implementations, the tire tread 18 may be formed from conventional tread rubber compositions, as are well known to those skilled in the art. In certain embodiments, the tire tread may include natural rubber, synthetic rubbers, or blends thereof. In one or more implementations, the tire tread 18 may include known additives such as, for example, oils, fillers, processing aids, zinc oxide, stearic acid, sulfur, various accelerators, antioxidants and antiozonants. In certain implementations, fillers may include carbon black and/or silica.

In one or more embodiments, the tire tread 18 may be substantially cured at the time of positioning the tread around the tire casing 12. Those skilled in the art will appreciate that curing is a matter of degree, and that rubber articles that are not 100% cured may still be referred to as cured or vulcanized. In one or more implementations, the tire tread may be at least 80% cured when it is positioned around the tire casing, in other implementations at least 85% cured, in other embodiments at least 90% cured, and in still other implementations at least 95% cured.

In one or more implementations, the tire tread 18 includes a band 20 that is generally planar and has a contact surface 22 that engages the cushion rubber and an outer surface 24 facing radially outwardly. A plurality of lugs 26 extend radially outwardly from the outer surface 24 of the band 20 to create a tread pattern on the outer circumferential surface of the tire 10. In certain implementations, each of the lugs 26 may include a plurality of side surfaces 26a extending away from the band 20 and tire casing 12, and an engagement surface 26b for contacting the ground.

Any number of lugs 26 in any desired sizes and shapes may be provided to produce innumerable tread patterns. The lugs 26 may have a height, as compared to the height of the band 20, to provide the necessary traction and grip for the tire. The height of the band 20 and the lugs 26 refers to the radial distance between the contact surface 22 and the most distal radial point or surface of the lug 26.

After positioning the tire tread 18 around the tire casing 12, the tread may be spliced at longitudinal ends of the band 20 to form a continuous outer surface of the tire. Known rubber splicing materials and techniques may be employed to splice the opposing longitudinal ends of the tire tread 18 together. In certain embodiments, an adhesive may be applied to the longitudinal ends of the tire tread 18, and an uncured strip of splice rubber may be positioned between the longitudinal ends of the tire tread 18. As will be apparent to those skilled in the art, subsequent curing of the tire will create a continuous tire tread 18 and permanently secure the longitudinal ends of the tire tread 18 together.

In one or more implementations, a green tire assembly, including the tire casing 12, cushion rubber 16, and tread 18, may be positioned within a rubber envelope 30 prior to curing. The adhesion between the tire casing 12 and the tread 18 has not been completed in the green tire assembly. In certain implementations, the cushion rubber 16 of the green tire assembly is substantially uncured.

The rubber envelope 30 includes an open end 32 facing an axis of rotation of the envelope 30. The open end 32 is defined by opposing radial edges 34a and 34b, which are adapted to be positioned adjacent to the bead portions 36a and 36b of the tire casing 12. Sidewalls 35 of the envelope extend radially from the radial edges 34a and 34b to an outer circumferential surface 37. Thus, as will be appreciated by those skilled in the art, the envelope 30 has the same general shape as the green tire assembly. The envelope 30 is sized to fit snugly over the tread 18 and to allow the radial edges 34a and 34b to extend beyond the bead portions 36a and 36b of the tire casing 12.

In one or more implementations, the envelope 30 may be spread to allow insertion of the green tire assembly. Any conventional devices and methods may be employed to spread the envelope 30 and position the green tire assembly within the spread envelope 30. In certain implementations, the envelope 30 may be spread by a machine having a plurality of arms extending radially from the envelope 30, the arms adapted to engage one of the radial edges 34a or 34b and stretch the envelope 30 radially outwardly to enlarge the diameter of the opening of the open end 32 defined by the radial edge. Following insertion of the green tire assembly, the arms are adapted to release the radial edges 34a or 34b to allow the envelope 30 and the radial edges 34a or 34b to return to their respective original positions.

In one or more implementations, the envelope 30 includes a plurality of recesses 38 extending radially outwardly from the outer circumferential surface 37. In certain embodiments, the recesses 38 may each be sized and shaped to receive a lug 26 therein. Accordingly, the dimensions of each of the recesses 38 are substantially similar to but slightly larger than the dimensions of the lugs 26 to be received therein. The number and spacing of the recesses 38 may conform to the number and spacing of the lugs 26 so that each recess 38 receives a single lug 26 therein. In certain embodiments, each recess 38 may include side surfaces 38a extending radially outwardly from the outer circumferential surface 37 and a distal surface 38b corresponding to the side surfaces 26a and engagement surfaces 26b of the lugs 26, respectively. As a result, the envelope 30 has substantially the same outer profile as the tire tread 18 prior to depressurization of the envelope, as discussed below.

In one or more implementations, the green tire assembly and envelope 30 may be mounted on a rim 40 following insertion of the green tire assembly into the envelope 30. The envelope 30 is secured between the green tire assembly and the rim 40 adjacent to the bead portions 36a and 36b and the radial edges 34a and 34b. As will be discussed in greater detail below in reference to FIGS. 2-3, a leak testing process 200 may be implemented to test the seal of the envelope 30.

The tire casing 12 may then be inflated, such as by an inflation tube (not shown), to create an increased pressure within the tire and exert a sealing pressure between the green tire assembly, the envelope 30, and the rim 40. As will be understood by those skilled in the art, the interior of the envelope 30 is sealed at the rim 40 by virtue of the internal pressure within tire casing 12 to create an inner space between the envelope 30 and the green tire assembly. When mounted on the rim 40, the green tire assembly and envelope 30 may be referred to as a tire assembly 42.

In one or more implementations, the tire assembly 42 may be transported to a curing environment following mounting of the green tire assembly and envelope 30 on the rim 40. In certain implementations, the curing environment may be, for example, an autoclave or pressure vessel in which the temperature and pressure are controlled. In one or more implementations, a plurality of tire assemblies 42 may be placed in the curing environment together to allow for simultaneous curing of the assemblies 42. In certain implementations, a heated and/or pressurized curing medium, such as, for example, air, water, steam, or a combination thereof, may be introduced into the curing environment to simultaneously press the tire tread 18 against the tire casing 12 and cure the cushion rubber 16 positioned therebetween. Upon exiting the curing environment, the green tire assembly is converted to a treaded or retreaded tire 10, with the cushion rubber 16 substantially cured and creating a permanent bond between the tire casing 12 and the tire tread 18.

In one or more implementations, the curing medium within the curing environment (e.g. air or steam) may create a pressure within the curing environment of at least 5 kg/cm$^2$, in other implementations a pressure of at least 5.5 kg/cm², in still other implementations a pressure of at least 6.0 kg/cm², and in yet other implementations a pressure of at least 7 kg/cm².

In one or more implementations, the curing medium within the curing environment (e.g. air or steam) may create a temperature within the curing environment of at least 100° C., in other implementations a temperature of at least 105° C., in still other implementations a temperature of at least 110° C., and in yet other implementations a temperature of at least 115° C.

In one or more implementations, the tire assembly 42 may remain in the curing environment for at least 2.0 hours, in other implementations at least 2.5 hours, in still other implementations at least 3.0 hours, and in yet other implementations at least 3.5 hours.

In one or more implementations, the envelope 30 may include a valve 44 that allows fluid to flow from one side of the envelope 30 to the other. The valve 44 may be any known and conventional valve for suitable for transfer of gasses, and may be manufactured as an integral component of the envelope 30. The valve 44 communicates with the inner space between the envelope 30 and tire 10.

In one or more embodiments, the valve 44 may be connected to and in fluid communication with a vacuum source 45 to depressurize the envelope 30 and reduce or substantially eliminate air within the envelope 30 of the tire assembly 42 and between the envelope 30 and the tire tread 18 and/or tire casing 12. In one or more implementations, the envelope 30 may be depressurized throughout the curing process. In other implementations, the envelope 30 may be depressurized for at least a portion of the curing process.

As will be apparent to those skilled in the art, the inclusion of recesses 38 in the envelope 30 allows for an intimate relationship between the envelope 30 and tread 18 across substantially all of the surface area of the lugs 26. This intimate relationship prevents deformation of the lugs 26 in the pressurized curing environment, and reduces the amount of air remaining within the envelope to improve the bond between the tread 18 and the tire casing 10 of the retreaded tire. U.S. Pat. No. 4,434,018 discloses suitable retread curing equipment and methods, and is incorporated herein by reference in its entirety for that purpose. In some implementations, the envelope 30 omits the recesses 38 and can be a singular envelope 30 for encasing the tire tread 18, tire casing 12, and cushion rubber 16 therein.

Following curing, the tire assembly 42 may be removed from the curing environment, and the valve 44 may be opened to allow air to reenter the inner space of the envelope 30. In one or more implementations, the tire 10, with the tread 18 permanently adhered thereto, and the envelope 30 may then be removed from the rim 40. In certain implementations, the tire 10 may then be inspected to ensure that the tire tread 18 is properly secured to the tire casing 10. In one or more implementations, excess tread rubber may be removed and the tire 10 may be painted and readied for subsequent use.

In an alternative implementation, the lugs 26 may be provided as separate and discrete components, rather than as projections from the band 20. In these implementations, method of forming a tire 10 may include positioning the lugs 26 within the recesses 38 before or after insertion of a tire casing 12, cushion rubber 16, and/or tread band 20 within the envelope 30. In certain implementations, the recesses 38 may be sized and shaped so as to impart a compressive force on the lugs 26 upon insertion, thereby maintaining the lugs 26 within the recesses 38 following insertion. The recesses 38 may be adapted to conform to the shape of the lugs 26.

In one or more implementations, a tire casing 12 may be positioned within an envelope 30 having recesses 38 containing lugs 26 therein. In certain implementations, the tire casing 12 may have a cushion rubber 16 disposed on an outer circumferential surface thereof when inserted into the envelope 30 to facilitate adhesion of the lugs 26 to the tire casing 12. In certain implementations a tread band 20 having a generally planar sectional profile may be positioned over the cushion rubber 16, and a second layer of cushion rubber may be provided over the tread band 20. In one or more implementations, a rubber cement and/or cushion rubber may be applied to a contact surface of the lugs 26 before or after insertion of the lugs 26 into the recesses 38 to facilitate bonding of the lugs to the tire casing 12, tread rubber 20, or cushion rubber 16.

Following insertion of the lugs 26 into the recesses 38 and positioning of a tire casing 12, cushion rubber 16, and optionally a tread band 20 and a second layer of cushion rubber within the envelope 30, the method of forming the retreaded tire proceeds as discussed above. A tire assembly 42 is formed with a rim 40, and the tire assembly is cured. The depressurization of the envelope causes the lugs 26 to contact the exposed outer circumferential surface of the prepared tire casing, and the cushion rubber therebetween acts to permanently bond the lugs 26 to the tire casing. The correspondingly shaped lugs 26 and recesses 38 allow for removal of substantially all of the air between the tire casing 12 and the envelope 30 upon depressurization of the envelope.

FIG. 2 depicts an example system 100 depicting the tire assembly 42, a vacuum system 50, and a controller 60. The vacuum system may include the vacuum source 45 of FIG. 1 and may be selectively coupleable to the valve 44 and/or another component in fluid communication with the valve 44. The tire assembly 42 includes an envelope 30 that is in fluid communication with the vacuum system 50 to depressurize and remove any air from the envelope 30. In some implementations, the vacuum system 50 includes a Venturi vacuum pump that uses air pressure from an air source (not shown) to create a vacuum to depressurize the envelope 30. The vacuum system 50 is electrically and communicably coupled to a controller 60. The controller is configured to control the vacuum system 50 to depressurize the envelope 30 and to perform a leak testing process 200 described in greater detail in reference to FIG. 3. The controller 60 can be a programmable logic controller (PLC) to selectively open one or more valves of the vacuum system 50 and/or to control other components, such as a warning lamp 62 or other indicator. In some implementations, the warning lamp 62 may instead or additionally be an audible indicator, such as a horn or buzzer.

In some implementations, the vacuum system 50 can be coupled to several envelopes 30 of several tire assemblies 42 sequentially or in parallel via a manifold. For instance, a manifold may have a single selectively fluidly coupleable inlet and several outlets in fluid communication with the valves 44 of several envelopes 30. In some implementations, several vacuum systems 50 may be coupled to the controller 60. In some implementations, the controller 60 may be electronically or communicably to one or more other components, such as disable circuitry that disables the vacuum system 50 from operating above a predetermined level if the controller 60 determines that a leak is present in one or more envelopes fluidly coupled to the vacuum system 50.

Figure 3:
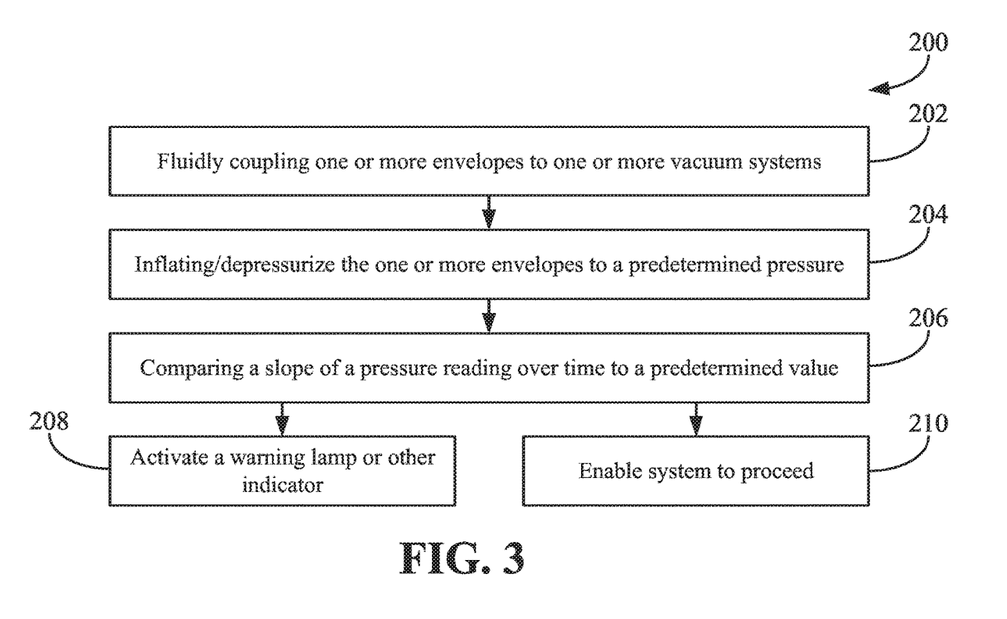
FIG. 3 is a process diagram for leak testing the curing envelope.

FIG. 3 depicts an implementation of a leak testing process 200 that can be performed by the controller 60 for leak testing one or more envelopes 30 in fluid communication with the vacuum system 50. The method 200 includes fluidly coupling one or more envelopes 30 to one or more vacuum systems 50 (block 202). In some implementations, the fluid coupling may include attaching a tube to a valve or a connector of the envelope 30 and/or a tube of the envelope 30 to a valve or connector of the one or more vacuum systems 50. As noted above, in some implementations, the fluid coupling may be via a manifold for systems coupled to multiple envelopes 30. The fluid coupling may be performed manually or may be automated (e.g., the controller 60 or another controller may automatically attach a tire assembly 42 to the vacuum system 50).

The process 200 includes inflating or depressurizing the one or more envelopes to a predetermined pressure (block 204). The vacuum system 50 and/or another system may be used to inflate the one or more envelopes to the predetermined pressure. In some implementations, such as a Venturi vacuum system, an air pressure supply source for the venture vacuum pump can be rerouted, such as through a valve, to provide an air supply into the one or more envelopes 30 that are fluidly coupled to the vacuum system 50. In other implementations, a separate air supply source may be used to provide air to inflate the one or more envelopes. In other implementations, the vacuum system 50 and/or another system may be used to depressurize or apply a vacuum to the one or more envelopes 30 to the predetermined vacuum pressure.

The predetermined pressure may be a low pressure, such as 10 psi or below, to inflate the one or more envelopes for leak testing, but not overinflate and/or burst the one or more envelopes if a leak or improper attachment of the one or more envelopes 30 occurs. In some implementations the predetermined pressure can be between 0.1 psi, inclusive, and 9.9 psi, inclusive. In other implementations, the predetermined pressure may be a low negative pressure or vacuum, such as −14.7 psi or above, to depressurize the one or more envelopes for leak testing. In some implementations the predetermined pressure can be between −0.1 psi, inclusive, and −14.6 psi, inclusive.

The process 200 further includes comparing a slope of a pressure reading over time to a predetermine value (block 206). The controller 60 and/or the vacuum system 50 can be communicably coupled to a pressure sensor to detect a pressure within the one or more envelopes 30 and/or of a tube or fluid line in fluid communication with the one or more envelopes 30. In some implementations, one or more detected pressure readings can be stored in a computer readable storage medium, such as a random access memory of the controller 60. In some implementations, a single pressure reading is acquired and the predetermined pressure above is stored as an initial pressure measurement.

For instances where a positive inflation pressure is applied, if the slope of the pressure reading over a period of time, such as one second, is less than the predetermined value, then the controller 60 is configured to determine there is a leak in the one or more envelopes and/or one or more of the envelopes is improperly mounted. That is, the controller 60 can access data indicative of one or more pressure sensor measurements, either from a pressure sensor directly or from the computer readable storage medium, and determine the slope of the pressure reading over the period of time, such as $(P_2-P_1)/t$.

The process 200 can proceed to activating the warning lamp 62 (block 208) and/or another indicator or process responsive to the determination of a leak or improper mounting of the one or more envelopes. If the slope of the pressure reading over a period of time, such as one second, is more than or equal to the predetermined value, then the controller 60 is configured to determine there is no leak in the one or more envelopes and/or the one or more of the envelopes are properly mounted In some implementations, the predetermined value may be between 0 psi per second, inclusive, and 1 psi per second, inclusive. In some implementations, the predetermined value may be 0.1 psi per second.

If the controller 60 determines there is no leak based on the slope being more than or equal to the predetermined value, then the process 200 can proceed to enabling the system to proceed with depressurizing the envelope 30 (block 210). In some implementations, enabling the system to proceed may include setting a flag or a value for a parameter such that one or more enablement conditions for another process may be satisfied. For instance, if the controller 60 determined that there is no leak and/or the one or more envelopes are properly mounted, then a parameter value enabling a depressurization process to proceed may be set. In other implementations, the controller 60 may activate a switch to enable a button or other physical component to be actuated, such as an activate button to proceed with the depressurization when pushed by a person monitoring the system. In other implementations, the controller 60 may automatically proceed with a depressurization process to depressurize the one or more envelopes. In some implementations, the process 200 may occur for each cycle for depressurization of one or more envelopes.

For instances where a negative depressurization vacuum is applied, if the slope of the pressure reading over a period of time, such as one second, is less than the predetermined value, then the controller 60 is configured to determine there is a leak in the one or more envelopes and/or one or more of the envelopes is improperly mounted. In some implementations, the predetermined value may be between −0 psi per second, inclusive, and −1 psi per second, inclusive. In some implementations, the predetermined value may be −0.3 psi per second. In some implementations, the negative depressurization vacuum is applied and, if a vacuum of 6 inches of Hg holds for ten seconds, then the controller 60 is configured to determine there is no leak in the one or more envelopes and/or one or more of the envelopes is properly mounted.

If the controller 60 determines there is no leak based on the slope being more than or equal to the predetermined value, then the process 200 can proceed to activating the warning lamp 62 (block 208) and/or another indicator or process responsive to the determination of a leak or improper mounting of the one or more envelopes. If the slope of the pressure reading over a period of time, such as one second, is more than or equal to the predetermined value, then the controller 60 is configured to determine there is no leak in the one or more envelopes and/or the one or more of the envelopes are properly mounted. The process 200 can proceed to enabling the system to proceed with depressurizing the envelope 30 (block 210). In some implementations, enabling the system to proceed may include setting a flag or a value for a parameter such that one or more enablement conditions for another process may be satisfied. For instance, if the controller 60 determined that there is no leak and/or the one or more envelopes are properly mounted, then a parameter value enabling a depressurization process to proceed may be set. In other implementations, the controller 60 may activate a switch to enable a button or other physical component to be actuated, such as an activate button to proceed with the depressurization when pushed by a person monitoring the system.

In other implementations, the controller 60 may automatically proceed with a depressurization process to depressurize the one or more envelopes. In some implementations, the process 200 may occur for each cycle for depressurization of one or more envelopes.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system for leak testing an envelope for a tire assembly, the system comprising:
   a rim;
   an envelope sized to accommodate a green tire assembly and secured to the rim;
   a vacuum system in fluid communication with the envelope; and
   a controller configured to:
   depressurize the envelope to a predetermined vacuum;
   compare a slope of vacuum over time to a predetermined value; and
   enable proceeding with a depressurization of the envelope responsive to determining the slope of the vacuum over time being less than or equal to the predetermined value.

2. The system of claim 1, wherein the vacuum system comprises a Venturi vacuum system.

3. The system of claim 1, wherein the controller is further configured to:
   activate an indicator responsive to determining the slope of the vacuum over time being more than the predetermined value.

4. The system of claim 3, wherein the indicator is a warning lamp.

5. The system of claim 3, wherein the indicator is an audible indicator.

6. The system of claim 1, wherein the controller is further configured such that enabling proceeding with the depressurization of the envelope comprises setting a parameter value.

7. The system of claim 1, wherein the controller is further configured such that enabling proceeding with the depressurization of the envelope comprises activating a switch to enable a button or other physical component to be actuated.

8. The system of claim 1, wherein the predetermined vacuum is at or above −14.7 psi.

9. The system of claim 1, wherein comparing the slope of the vacuum over time to the predetermined value comprises accessing data indicative of one or more pressure sensor measurements.

10. The system of claim 1, wherein the predetermined value is between −0 psi per second and −1 psi per second.

11. The system of claim 1, wherein the vacuum system is in fluid communication with a plurality of envelopes.

12. A process for leak testing an envelope for a tire assembly, the process comprising:
pressurizing an envelope containing a green tire assembly mounted to a rim to a predetermined pressure using a vacuum system;
comparing a slope of vacuum over time to a predetermined value; and
enabling proceeding with a depressurization of the envelope responsive to determining the slope of the vacuum over time being less than or equal to the predetermined value or activating an indicator responsive to determining the slope of the vacuum over time being more than the predetermined value.

13. The process of claim 12, wherein the vacuum system comprises a Venturi vacuum system.

14. The process of claim 12, wherein the indicator is a warning lamp or an audible indicator.

15. The process of claim 12, wherein the predetermined vacuum is at or above −14.7 psi.

16. The process of claim 12, wherein the vacuum system is in fluid communication with a plurality of envelopes.

17. The process of claim 12, wherein enabling proceeding with the depressurization of the envelope comprises activating a switch to enable a button or other physical component to be actuated.

18. An apparatus for leak testing an envelope for a tire assembly, the apparatus comprising:
a vacuum system in fluid communication with an envelope, the envelope sized to accommodate a green tire assembly; and
a controller configured to:
depressurize the envelope to a predetermined vacuum;
compare a slope of vacuum over time to a predetermined value; and
enable proceeding with a depressurization of the envelope responsive to determining the slope of the vacuum over time being less than or equal to the predetermined value.

19. The apparatus of claim 18, wherein the vacuum system comprises a Venturi vacuum system.

20. The apparatus of claim 18, wherein the predetermined vacuum is at or above −14.7 psi.

* * * * *